(12) United States Patent
Harris et al.

(10) Patent No.: US 7,596,116 B2
(45) Date of Patent: Sep. 29, 2009

(54) APPARATUS FOR TRANSMITTING DATA PACKETS AND SUPPORTING METHOD AND DATA STRUCTURE

(75) Inventors: John M. Harris, Chicago, IL (US); Ronald T. Crocker, St. Charles, IL (US)

(73) Assignee: Motorola, Inc., Schaumburg, IL (US)

( * ) Notice: Subject to any disclaimer, the term of this patent is extended or adjusted under 35 U.S.C. 154(b) by 610 days.

(21) Appl. No.: 11/026,884

(22) Filed: Dec. 30, 2004

(65) Prior Publication Data

US 2006/0146714 A1  Jul. 6, 2006

(51) Int. Cl.
*H04W 4/00* (2009.01)
(52) U.S. Cl. .................... 370/328; 455/438
(58) Field of Classification Search ................ 370/236, 370/328, 338; 455/518, 519, 452.2
See application file for complete search history.

(56) References Cited

U.S. PATENT DOCUMENTS

| | | | |
|---|---|---|---|
| 6,633,574 B1 * | 10/2003 | Koch et al. | 370/410 |
| 6,856,628 B1 * | 2/2005 | Bychowsky et al. | 370/412 |
| 6,952,411 B2 | 10/2005 | Sinnarajah et al. | |
| 7,088,739 B2 | 8/2006 | DeMars et al. | |
| 7,089,027 B1 | 8/2006 | Welch et al. | |
| 2002/0141371 A1 * | 10/2002 | Hsu | 370/338 |
| 2002/0150092 A1 * | 10/2002 | Bontempi et al. | 370/389 |
| 2004/0203383 A1 * | 10/2004 | Kelton et al. | 455/41.2 |
| 2004/0240407 A1 * | 12/2004 | Ehrsam et al. | 370/328 |
| 2005/0152359 A1 | 7/2005 | Giesberts et al. | |
| 2005/0254513 A1 | 11/2005 | Cave et al. | |

FOREIGN PATENT DOCUMENTS

WO  02085050 A1  10/2002

\* cited by examiner

*Primary Examiner*—Jean A Gelin

(57) ABSTRACT

In the present technique of a transmission process, at least one portion of a data packet is sent (608) responsive to a first triggered relating to the data packet being detected (606), which is followed by a second trigger (628) that triggers at least one remaining portion of the data packet to be sent (630).

15 Claims, 5 Drawing Sheets

APPARATUS FOR TRANSMITTING DATA PACKETS AND SUPPORTING METHOD AND DATA STRUCTURE

TECHNICAL FIELD

This invention relates generally to a transmission technique for transmitting data packets between a mobile station and a network controller.

BACKGROUND

A significant factor in the startup setup delay of calls is the transmission time of the signaling packets. An invite packet, such as a push-to-talk ("PTT") session initiation protocol ("SIP") invite packet, is generally used to initiate a dispatch call, and an OK packet, such as a 200 OK SIP packet, is sent in response to the invite packet. These packets may be 300 bytes, but in some cases are much larger. In many systems, this means that the transmission time of these packets will take 300 milliseconds or longer.

As typically done, in the startup of an invite packet transmission is that the transmission of the invite packet does not begin until the user has pressed the send or PTT button, but this transmission time of the invite packet can be very significant. This, in turn, creates additional delay because the transmitter must transmit the entire invite packet after receiving the button push.

Also, as is typically done, in the startup of a OK packet transmission is that in some systems, the transmission of the OK packet does not begin until the invite packet is received, but this transmission time of the OK packet can be very significant. This, in turn, creates another additional delay because the transmitter must transmit the entire OK packet after receiving the invite packet.

Data are generally broken down into data frames packaged into a single data packet at a time for transmission via a network. In most current conventional systems of dispatch and voice over Internet protocol ("VoIP") calls, five data frames are typically sent per packet in order to decrease cost incurred by the per packet overhead. In order to wait for enough data to generate the data frames needed for a single data packet, however, the system must wait for approximately 120 millisecond ("msecs") or more of audio to occur before transmission can begin. In fact, it may even be longer because the packet header is not sent until the entire packet is constructed. The transmission itself, then, typically takes approximately another 120 msecs or more, assuming the transmission is on a fundamental channel in a nominally loaded system. That is a total minimum wait time of approximately 240 msecs in order to transmit a data packet.

Although the wireless link layer, such as the Radio Link Protocol (RLP), allows the packets to be sent in sections, each frame contains only a length field along with a data field, but any extra space in the frame is padded so that no other information can be stored in the packet. This protocol, however, may skip unknown portions of the packet, and as a result, will send the skipped portions along with the portions that were previously sent as a retransmission at a later time, which wastes bandwidth. Moreover, this method does not adequately address the delay problems and the unknown portions of the packets, which is quite common in existing cellular systems.

BRIEF DESCRIPTION OF THE DRAWINGS

The above needs are at least partially met through provision of the data packet transmission technique described in the following detailed description, particularly when studied in conjunction with the drawings, wherein.

Figure 1:
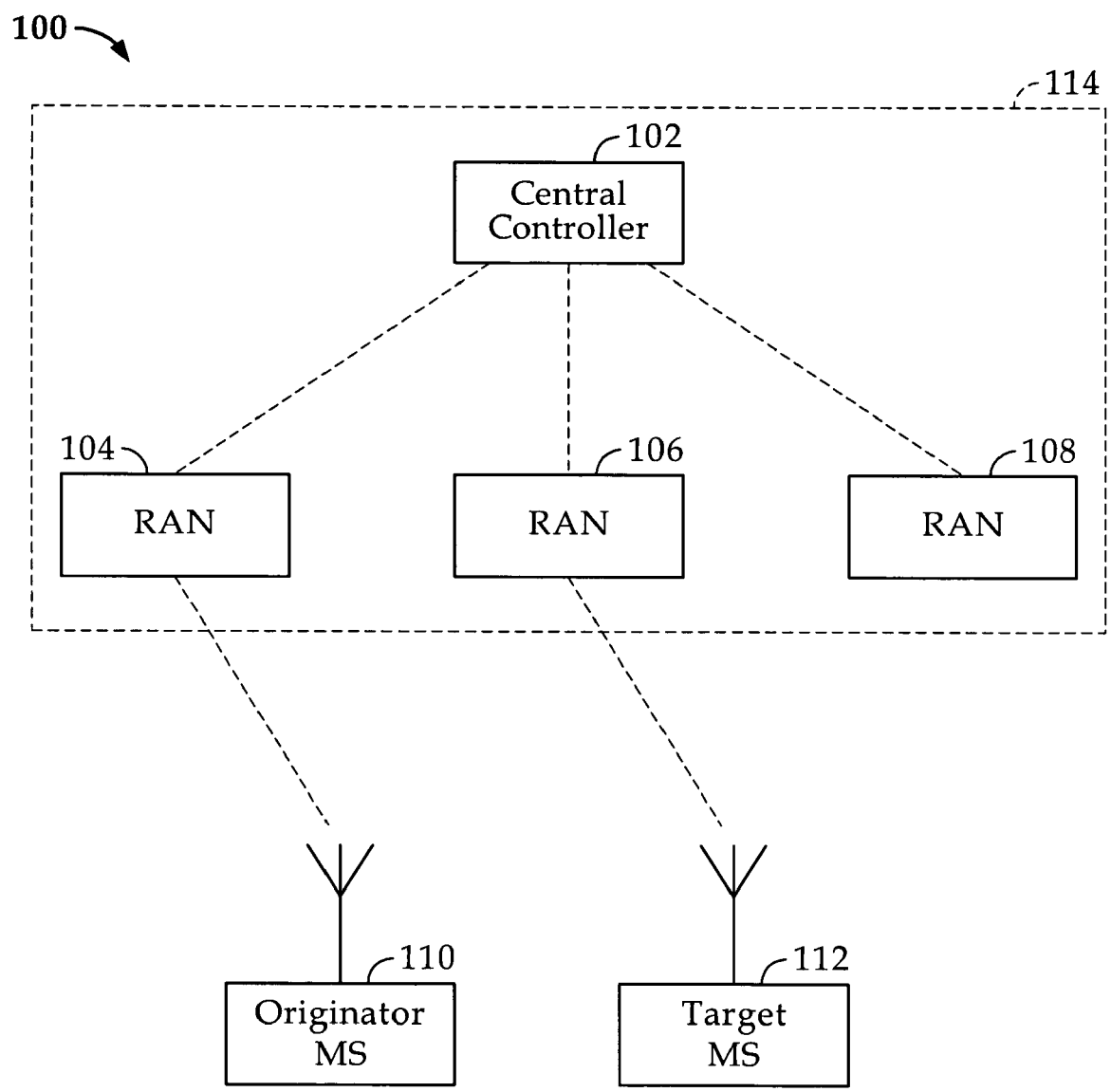
FIG. 1 comprises a block diagram of a typical wireless communication system suitable for various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, at least one portion of a data packet is sent responsive to a first trigger relating to the data packet being detected, which is followed by a second trigger that triggers at least one remaining portion of the data packet to be sent. In one embodiment, the first trigger includes, but is not limited to, a function triggered when a contact list is opened, a function triggered when a packet is received, a function triggered when a packet with a predefined header is received, a function triggered when a traffic channel is active, a function triggered when a transmission termination message is received, and a function triggered when waiting for an acknowledgement packet to be received. The second trigger similarly includes, in one embodiment, a function triggered when service is initiated, a function triggered when a respond packet is received, and a function triggered when a partial respond packet is received. In another embodiment described, at least one wait message is sent to instruct a network controller to wait for the remaining portion(s) of the data packet, which takes place before the second trigger is detected. In another embodiment, the remaining portion of the data packet is sent with a higher reliability than the at least one portion of the data packet. Also prior to the second trigger being detected, at least one transmission of empty bits is sent that acts as a placeholder for the remaining portion of the data packet in another embodiment.

In various embodiments, specifically prior to the second trigger being detected, a determination is made as to whether a new session can be started responsive to a next data packet being detected and in addition to the current session involving the current data packet. If a new session can be started, at least one portion of the next data packet is sent using the new session. If a new session cannot be started, then the transmission of the current data packet is terminated and the next data packet is sent via the current session. In one embodiment, the termination of the current data packet transmission also includes a message being sent to indicate that the transmission of the current data packet has been terminated. The at least one portion of the next data packet will then be sent on the current session once the previously transmitted packet has been terminated.

Through the various embodiments, an improved data packet transmission technique has been provided that, among other things, reduces the startup delay of the transmission while accommodating skipped portions of the data packet without retransmission. The various teachings effectively reduce delay in PTT call setup. Moreover, any skipped portion that causes retransmission of data is substantially removed, and thus unnecessary use of the bandwidth is avoided. A shorter transaction data upload has also been provided through the various teachings. In one embodiment of a dispatch call setup, the audio delay has been reduced by as much as approximately 240 msecs or more, specifically 120 msecs per direction. The benefit is even greater in larger loaded systems where the data frames per packet are larger. The overall call setup, as a result, is reduced by approximately 500 msecs or more in this example. In some cases where target speculation is used, the various embodiments can eliminate approximately 300 msecs of delay time in the call setup. Furthermore, since there is plenty of time to perform automatic repeat requests ("ARQs"), the speculative first packet fragment can be sent at lower power, which would ultimately reduce the overall radio frequency ("RF") impact.

Referring now to the drawings, and in particular to FIG. 1, for purposes of providing an illustrative but non-exhaustive example to facilitate this description, a specific operational paradigm using a wireless communication system is shown and indicated generally at 100. Those skilled in the art, however, will recognize and appreciate that the specifics of this illustrative example are not specifics of the invention itself and that the teachings set forth herein are applicable in a variety of alternative settings. For example, since the teachings described are not platform dependent, they can be applied to various systems, such as, but not limited to, Code Division Multiple Access (CDMA) systems, Time Division Multiple Access (TDMA) systems, Universal Mobile Telecommunications Systems ("UMTSs"), and General Packet Radio Service ("GPRS") systems. In fact, any communication network that transmits data packets is contemplated and are within the scope of the invention.

Referring now to the exemplary communication network shown in FIG. 1, a central controller 102 is operably coupled to multiple radio access network ("RAN") 104, 106, 108, which include other components, such as a base station and/or base station controller (not shown). The radio access network 104, 106, 108, in turn, provide service to multiple mobile stations ("MSs") 110, 112 (two shown) via associated transceivers (not shown), such as Base Transceiver Stations (BTSs) or Node Bs. Since current cell phones have many similar functions to that of computer devices, a mobile station will be herein used to refer to any device that can transmit data packets, which includes, but is not limited to, cell phones, personal digital assistants, and/or computers. In this example, MS 110 is an originator MS that is trying to communicate with MS 112, which would be referred to as the target MS. In other words, the originator MS 110 will initiate a call setup with the target MS 112, which will result in data packets being sent between the two MSs. Specifically, the originator MS 110 transmits data packets to the RAN 104, and the target MS 112, in turn, responds to the RAN 106. The data packets obtained by the RAN 104 are controlled by the central controller 102 that responds and routes the various data packets through the RAN 106 that is serving the target MS 112. The central controller 102 along with the RANs 104, 106, 108 will herein be referred to as a network controller 114 to emphasize that the various teachings described can transmit data packets to either the central controller or the serving RAN. The communication system 100 shown is a typical exemplary structure of data packets transmission between an originator MS and a target MS.

Figure 2:
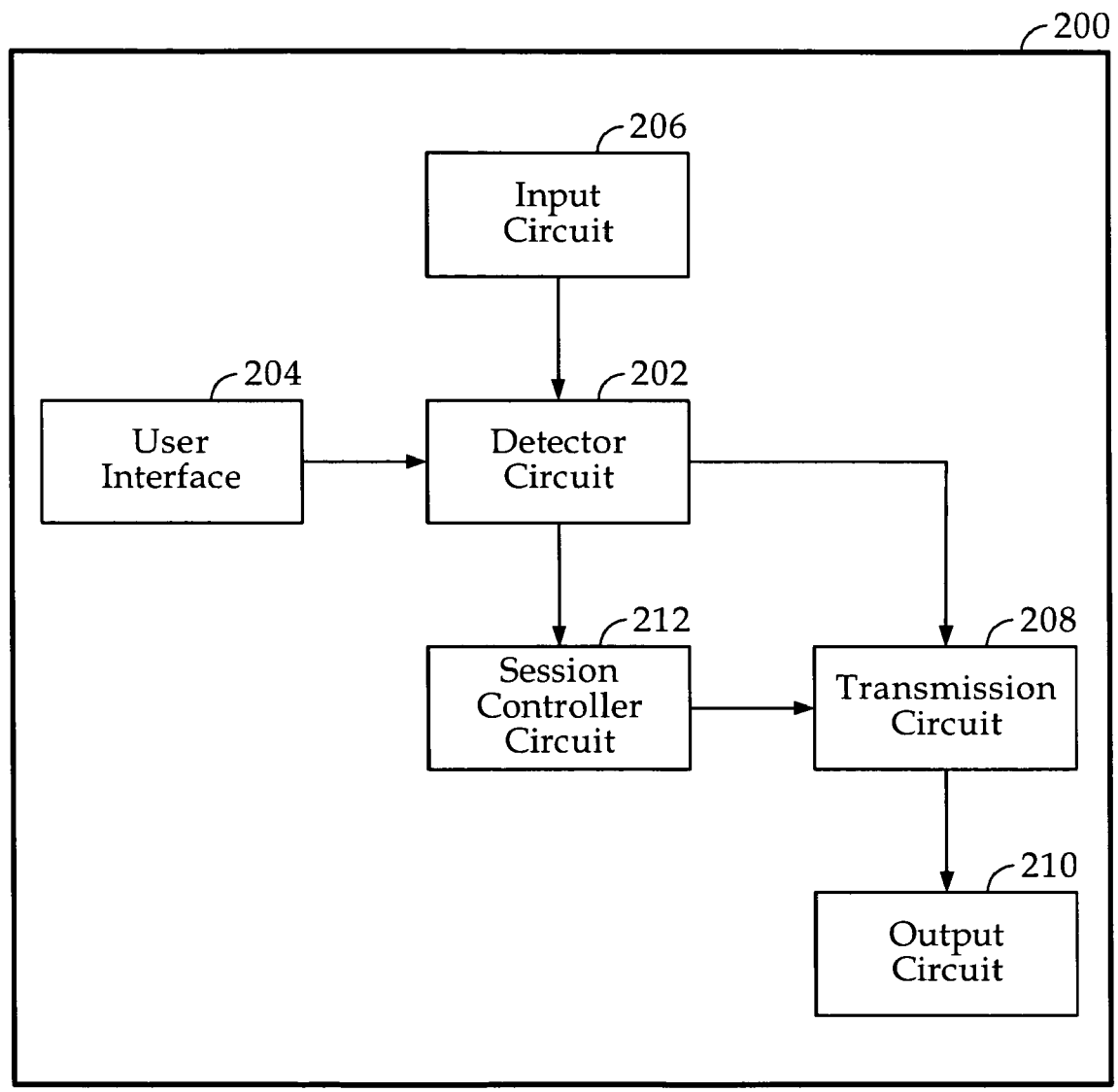
FIG. 2 comprises a block diagram of a mobile station suitable for various embodiments of the invention.

Referring to FIG. 2, a MS 200 suitable for various embodiments is shown. For simplicity and clarity, it should be noted that FIG. 2 does not include all the hardware components needed in a typical MS, which are commonly known in the art. Moreover, as a skilled artisan readily appreciates, other hardware configurations and circuitry topology layouts, although not shown, can be used to implement the various teachings described. As such, the MS 200 shown in FIG. 2 is provided as a practical example to implement the teachings of the various embodiments. In this exemplary MS shown, a detector circuit 202 is operably coupled to a user interface 204 and an input circuit 206 for receiving trigger functions. In particular, various functions from the user interface 204 and the input circuit 206 are received by the detector circuit 202, which, in turn, is adapted to detect a first and second trigger. In response to the first trigger and the second trigger being detected, the detector circuit 202 sends out portion(s) of a data packet that relates to the triggers via a transmission circuit 208, which ultimately outputs the portioned packets to an output circuit 210, such as an antenna. In one embodiment, the remaining portion of the data packet, which may be sent in response to the second trigger, is sent with a higher reliability than the at least one portion of the data packet, which may be sent in response to the first trigger.

Furthermore, the first trigger can be of multiple functions triggered by either the user interface 204 and the input circuit 206, which includes, but is not limited to, a function triggered when a contact list is opened, a function triggered when a packet is received, a function triggered when a packet with a predefined header is received, a function triggered when a traffic channel is active, a function triggered when a transmission termination message is received, and a function triggered when waiting for an acknowledgement packet to be received. The second trigger similarly includes multiple functions, such as a function triggered when service is initiated, a function triggered when a respond packet is received, and a function triggered when a partial respond packet is received.

With the use of the various triggers that send portion(s) of the data packet, the invite transmission delay is, for example, substantially removed from the critical path. The call setup and the data user experience delay, as a result, are also reduced. Of course, as readily appreciated by one skilled in the art, the functions that constitute the first and second triggers are specific to the different system implementations. As a result, the various teachings contemplate other first and second triggers that may not be specifically described, and they are with in the scope of the various embodiments provided. Moreover, although two triggers are shown as an example for clarity and simplicity, the various embodiments also contemplate any number N of triggers, and again this determination will greatly depend upon the specific implementation. Furthermore, the data packet can be broken down by any number M of portion(s) and remaining portion(s). As a result, these alternative embodiments are contemplated and are within the scope of the various teachings described.

In various embodiments, responsive to the wait time of the second trigger, the network controller 114 is notified to wait for the remaining portions of the data packet. In one embodiment, one or more wait messages are sent to the network controller 114 to instruct it to wait for the remaining portion(s) of the data packet. In another embodiment, one or more transmissions of empty bits, which act as a placeholder for the remaining portion(s) of the data packet, are sent to the network controller 114.

The detector circuit 202 is also operably coupled to a session controller circuit 212 that controls the transmit sessions of the MS 200. Specifically, the session controller circuit accommodates the case when the detector circuit 202 receives another data packet to be transmitted while waiting for the second trigger. As an example, a first trigger triggers a portion of a data packet to be transmitted, and while waiting for the second trigger, a second request comes in to transmit another data packet. The detector circuit 202, in this embodiment shown, sends the next data packet to the session controller circuit 212, which will decide whether a new session can be started to transmit this other data packet. If so, a new session is started to transmit this other data packet via the transmission circuit 208. In this case, the detector circuit 202 keeps waiting for the second trigger in the current session. If, on the other hand, the session controller circuit 212 decided that a new session cannot be started to transmit this other data packet, the data packet being transmitted on the current session is terminated. According to an embodiment, specifically, a message is sent to indicate that the transmission of the data packet has been terminated in the current session, and portion(s) of the other data packet will be accordingly sent on the current session, in response. In practice, by sending the other data packet on the current session, the network controller 114 conceives this function itself as a termination message of the previous data packet being transmitted. With the use of the session controller circuit 212 and the detector circuit 202, multiple sessions can, as a result, be running simultaneously without conflicts.

Figure 3:
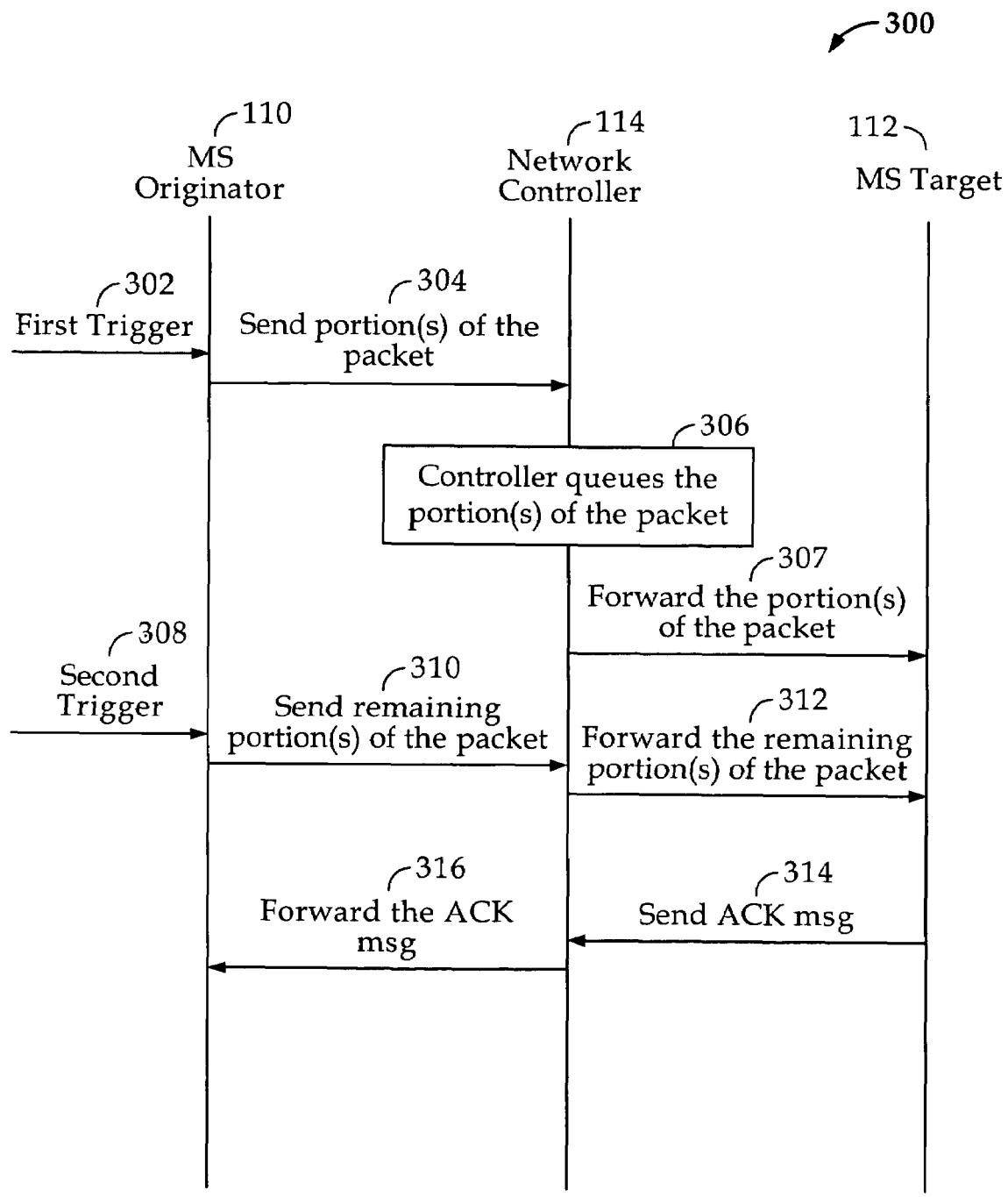
FIG. 3 comprises a call flow diagram of a transmission process according to various embodiments of the invention.

Turning now to FIG. 3, a call flow diagram 300 of a transmission process according to various embodiments of the invention is shown and indicated generally at 300. The call flow 300 begins with a first trigger 302 being triggered at the originator MS 110, and in response, it sends portion(s) of the data packet 304. The network controller 114 will then queue 306 the portion of the data packet and send 307 out portion(s) of the data packet to the target MS, as is typically done in the art. At this time, the originator MS will wait for the second trigger. Assuming no attempt is made to transmit another data packet, the originator MS receives a second trigger 308 at some point without interruptions, and similarly in response, sends the remaining portion(s) of the data packet 310 to the network controller 114. The remaining portion(s) of the data packet 312 is accordingly forwarded to the target MS 112 by the network controller 114. In this example shown, the target MS 112 sends an ACK message 314 as expected to the network controller 114 that, in turn, forwards 316 it to the originator MS as an indication to start the transmission. As a result, the call setup between MS originator and MS target is completed. Unlike the prior art, however, since a portion(s) of the packet is sent at the first trigger, there is less of a startup delay.

Figure 4:
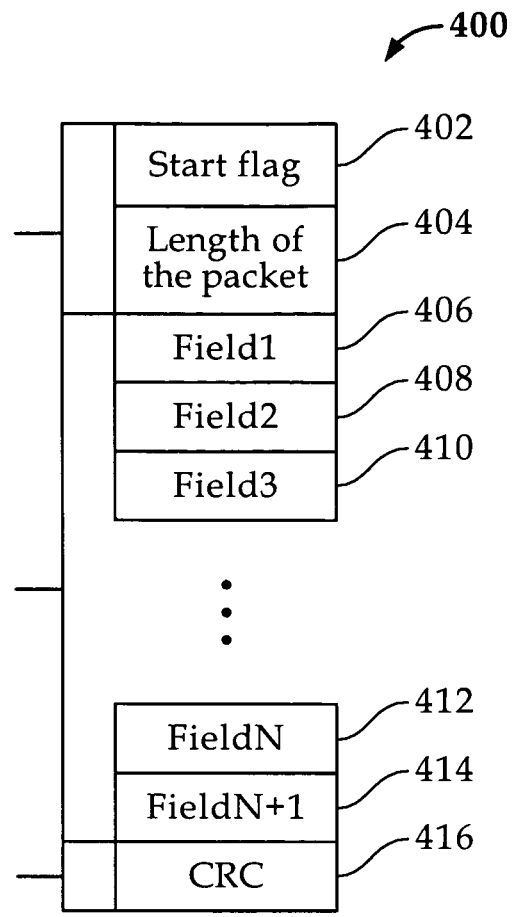
FIG. 4 comprises a data structure of a data packet according to various embodiments of the invention.

Referring now to FIG. 4, one exemplary data structure of a portioned data packet that complements the teachings of the various embodiments described is shown and indicated generally at 400. Since, technically, every packet sent can be considered a data packet, this may cause confusion between a complete data packet sent in the prior art versus a portioned data packet of the complete data packet sent in the various teachings described. As such, to be clear, although the data structure shown is called a portioned data packet, which refers to a portion of the complete data packet, it should be understood that the portioned data packet nevertheless has a similar structure as compared to a typical data packet, with the exception that the information contained in the packet is different because it is a portion of the complete data packet. This is at least true of the exemplary data structure shown in FIG. 4. For example, a data packet of a call setup will include all the information need to complete the call setup, whereas the portioned data packet contains only a portion(s) of the data packet of the call setup.

As one skilled in the art would readily recognize, however, other data structures can also be used. But in order to give a practical description, an exemplary data structure for use with the various embodiments is shown through FIG. 4. Thus, it should be understood that other various data structures are within the scope of the present invention. For this example, a field for a start flag 402 that defines whether this packet sent is the first portion or last portion the data packet, and another field that defines the length of the packet 404 is also included. The remaining fields shown as field1 406, field2 408, field3 410, ..., fieldN 412, and fieldN+1 414 are data fields that may contain, for example, data frames of the data packet, specifically portion(s) of the complete data packet. For the last field, as typically done with data packets, a cyclic redundancy check ("CRC") 416 is placed to check the data for errors. Since the portioned data packet shown follows the structure of a general data packet, although the information in the packet is different from the prior art, the data structure shown can be seamlessly implemented into an existing system because only the MS is modified in this embodiment.

As a practical example, assuming the opening of a contact list on the originator MS 110 invokes the first trigger, the target MS 112, however, is not known at this time, because the user has not yet picked a target MS. In the prior art based on this example, the originator MS 110 waits until all the information needed to setup the call is obtained before it will start constructing the data packet. This is, however, very inefficient. As a result, an unnecessary delay is imposed upon the originator MS 110. In contrast, many of the various teachings shown would construct a data packet that includes a portion(s) of the complete call setup data packet, which may, for example, include only data that is currently known to originator MS at this time. The sending of these portion(s) will expedite the system initiating the call setup without necessarily identifying the target MS. And since the portion(s) are queued by the network controller 114, no memory is taken at the MS. Once a target MS is selected, triggering the second trigger as an example, the remaining portion that includes the target MS 112 identifier can be sent to the network controller 114 to complete the call setup data packet. Thus, when the second trigger is received, the transmission circuit 208 of the MS can send the missing portions of the packet or second portion instead of the entire packet. As a result, startup delay on multiple fronts has been improved. Furthermore, since there is plenty of time to perform the ARQ on the first portion, RF impact is also reduced because the speculative packet fragment can be sent at lower power.

Figure 5:
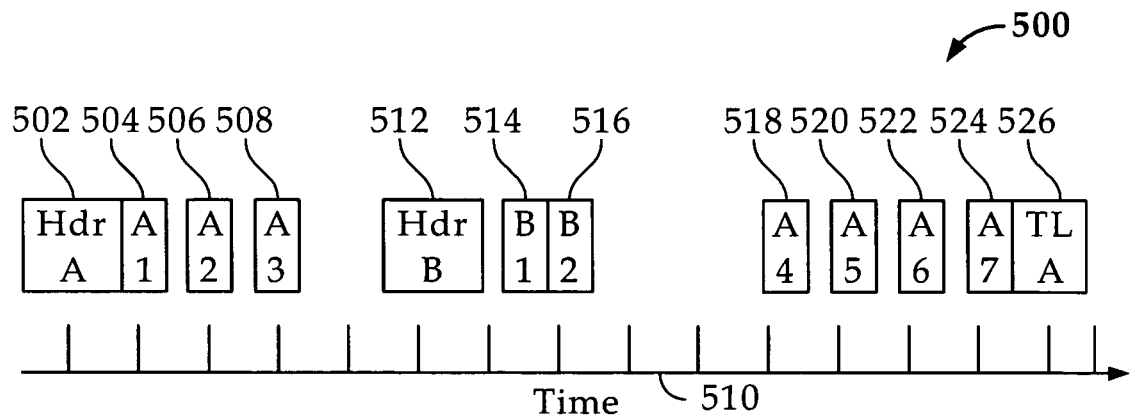
FIG. 5 comprises a time line of an exemplary transmission of two data packets according to various embodiment of the invention.

FIG. 5 illustrates a timeline of an exemplary transmission of two data packets according to various embodiments of the invention, which is indicated generally at 500. FIG. 5 depicts another feature of the various embodiment described. Specifically, as shown, a portioned data packet A, which includes a header A 502, data frame A1 504, data frame A2 506, and data frame A3 508, begins its transmission at the beginning of a timeline 510, responsive to a first trigger that relates to portioned data packet A. While waiting for the second trigger, a second data packet B arrives for transmission. In the various embodiments shown, assuming a new session can be started to transmit the data packet B, a portion of the data packet B (e.g., portioned data packet B), which includes header B 512, data frame B1 514, and data frame B2 516, can be sent while the MS is waiting for the remaining portions of the data packet A. It should be noted, however, that if a new session can be started for data packet B, the transmission of data packets A and B can be done simultaneously. With both transmissions started, the MS will eventually get the remaining information needed to complete the data packet. In this case, the remaining portion of data packet A, which includes data frame A4 518, data frame A5 520, data frame A6 522, data frame A7 524, and the tail of the data packet A 526 is transmitted, as shown. One point of FIG. 5 is to show that data packets can be transmitted simultaneously without unnecessary delay because portioned packets are sent, instead of waiting for all the information needed before the data packet can even be constructed. As a result, substantial time is saved from the process while accommodating multiple data packets to be transmitted on multiple sessions.

Figure 6:
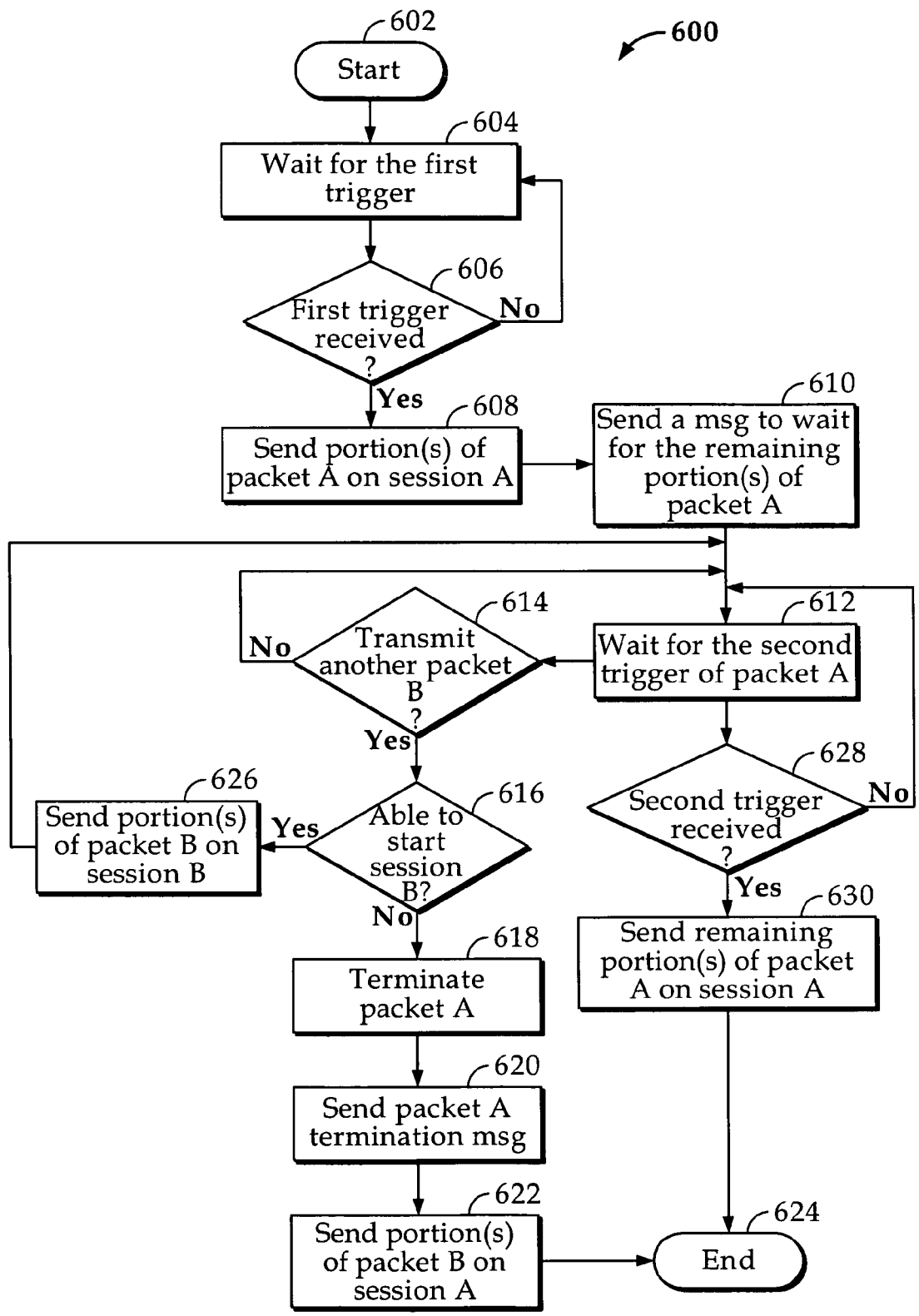
FIG. 6 comprises a flow chart diagram of a transmission process according to one embodiment of the invention.

Turning now to FIG. 6, a flow diagram of a transmission process according to one embodiment is shown and indicated generally at 600. Although the process shown is preferably implemented at the originator mobile unit, there may be other implementations that are better suited for each communication system. As a skilled artisan would readily appreciate, the flow diagram may be altered according to these different implementations. And as such, other embodiments of the transmission process are contemplated and are within the scope of the various teachings shown. In light of this, this particular process 600 shown starts 602 by waiting 604 for the first trigger. In particular, in this embodiment, the process determines 606 whether the first trigger has in fact been received. If not, the process keeps waiting 604 until the first trigger is received. Upon the first trigger being detected, at least one portion of a data packet A is sent 608 on a session A. Note that for clarity, data packets A and B have been used to designate a first and second data packet in the process. Furthermore, data packets A and B refer to the data packet with the complete information needed and the portion(s) of the packets refers to the portioned packets of the data packet, as previously discussed. In response to the portioned data packet of data packet A being sent, a message is also sent 610 to indicate a wait request for the remaining portion(s) of data packet A. The process continues to wait 612 for the second trigger of data packet A. In this case, two scenarios can potentially happen while waiting for the remaining portion(s) of data packet A.

In this first scenario, the process detects 614 another data packet B that needs to be transmitted. Specifically, in this embodiment shown, the process determines 614 whether another data packet B is requesting transmission. If not, the process goes back to wait 612 for the remaining portion(s) of data packet A. If, on the other hand, another data packet B is requesting transmission, the process determines whether a new session can be started to transmit the data packet B. If not, the transmission of the data packet A is terminated 618 in order to use the current session A to transmit the data packet B. Specifically, the process sends 620 a termination message to indicate that the transmission of data packet A has been terminated and sends 622 portion(s) of data packet B on session A, which brings the process to an end 624. As noted, the termination message can be indicated by simply starting the transmission of data packet B.

If, on the other hand, a new session can be started for data packet B, a new session B will be started to send 626 another portion(s) of data packet B (e.g., portioned data packet B). In this case, the process will now wait for information needed for the remaining portion of the data packet B. This, however, is not shown because it will make the flow chart overbearing. As such, please note the data packet B will run through the same process as data packet A, although not specifically shown, because there may be multiple data packets being transmitted simultaneously. In light of the understanding that simultaneous transmissions may be taking place at any given time, the process goes back to wait 612 for the second trigger of data packet A, which brings the process to the second scenario.

In the second scenario, which may be looped back from the subroutine of data packet B, the process determines 628 whether a second trigger is received. If not, the process again goes back to wait 612 for the second trigger. If the second trigger is received, the process accordingly sends the remaining portion(s) of data packet A on session A, which brings the process to an end 624.

Through these various teachings shown, a novel data packet transmission technique has been provided. As a result of the various teachings shown, the overall startup delay of the transmission has been reduced while accommodating for skipped portions of the data packet without retransmissions. Specifically, for example, the setup delay time has been reduced along with the transaction data upload delay by eliminating the time are to transmit the first portion from the critical path or delay components contributing to the setup delay. Moreover, with the removal of retransmission, generally caused by the skipped portion(s), the use of bandwidth is conserved. Since plenty of time is made available for ARQs, the overall RF impact is also reduced since speculative packet fragment can be sent at lower power.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method of transmitting data packets between a mobile station and a network controller comprising:
   the mobile station detecting a first trigger related to a data packet;
   the mobile station sending at least one portion of the data packet to the network controller responsive to the first trigger;
   the mobile station detecting a next data packet to be transmitted;
   the mobile station determining whether a new session can be started to transmit the next data packet responsive to detecting the next data packet to be transmitted;
   when a new session can be started to transmit the next data packet,
      the mobile station sending at least one portion of the next data packet on a new session;
      the mobile station detecting a second trigger related to the data packet, the second trigger comprising receiving information to be included in at least one remaining portion of the data packet; and
      the mobile station sending the at least one remaining portion of the data packet to the network controller responsive to the second trigger, the at least one remaining portion comprising the received information;
   when a new session cannot be started to transmit the next data packet, the mobile station terminating transmission of the data packet.

2. The method according to claim 1, wherein the first trigger comprises a function triggered when a contact list is opened.

3. The method of claim 2 wherein the information to be included in at least one remaining portion of the data packet is an identifier of a target mobile station selected subsequent to opening of the contact list.

4. The method according to claim 1 further comprising, prior to detecting the second trigger related to the data packet:
the mobile station sending at least one wait message to instruct a network controller to wait for the at least one remaining portion of the data packet.

5. The method according to claim 1 further comprising, prior to detecting the second trigger related to the data packet:
the mobile station sending at least one transmission of empty bits as a placeholder for the at least one remaining portion of the data packet.

6. The method according to claim 1, wherein terminating transmission of the data packet further comprises:
the mobile station sending a message to indicate that transmission of the data packet has been terminated; and
the mobile station sending at least one portion of the next data packet on a current session.

7. The method according to claim 1, wherein the remaining portion of the data packet is sent with a higher reliability than the at least one portion of the data packet.

8. An apparatus for transmitting data packets between a mobile station and a network controller comprising:
a detector circuit that detects a first trigger related to a data packet and a second trigger related to the data packet, the second trigger comprising receiving information to be included in at least one remaining portion of the data packet; and
a transmission circuit operably coupled to the detector circuit, wherein the transmission circuit sends at least one portion of the data packet responsive to the first trigger and sends at least one remaining portion of the data packet responsive to the second trigger, the at least one remaining portion comprising the received information.

9. The apparatus as defined in claim 8, wherein the first trigger comprises a function triggered when a contact list is opened.

10. The apparatus as defined in claim 8, wherein the detector circuit further comprises:
a means for detecting the first trigger and the second trigger.

11. The apparatus as defined in claim 8, wherein the transmission circuit further comprises:
a means for transmitting the at least one portion of the data packet responsive to the first trigger and the at least one remaining portion of the data packet responsive to the second trigger.

12. The apparatus as defined in claim 8, wherein the transmission circuit further sends at least one wait request message to instruct a network controller to wait for the at least one remaining portion of the data packet.

13. The apparatus as defined in claim 8, wherein the transmission circuit further sends at least one transmission of empty bits as a placeholder for the at least one remaining portion of the data packet.

14. The apparatus as defined in claim 8 further comprising:
a session controller circuit operably coupled to the detector circuit and the transmission circuit, wherein the session controller circuit determines whether a new session can be started to transmit a next data packet.

15. The apparatus as defined in claim 14, wherein the session controller circuit further sends at least one portion of the next data packet on a new session when a new session can be started to transmit the next data packet and terminates the transmission of the data packet when a new session cannot be started to transmit the next data packet.

* * * * *